Oct. 15, 1968  C. S. COCKERELL ET AL  3,405,675
WATER-BORNE GAS-CUSHION VEHICLES

Filed April 6, 1966  4 Sheets-Sheet 1

INVENTORS
C. S. COCKERELL
H. W. GRACE
J. A. BOUTLAND
BY Cameron, Kerkam & Sutton
ATTORNEYS Oct. 15, 1968  C. S. COCKERELL ET AL  3,405,675
WATER-BORNE GAS-CUSHION VEHICLES
Filed April 6, 1966  4 Sheets-Sheet 3

INVENTORS
C. S. COCKERELL
H. W. GRACE
J. A. BOUTLAND
BY
Cameron, Kerkam & Sutton
ATTORNEYS United States Patent Office 3,405,675
Patented Oct. 15, 1968

3,405,675
WATER-BORNE GAS-CUSHION VEHICLES
Christopher Sydney Cockerell, Bassett, Southampton, Herbert Willoughby Grace, Northwood, and John Anthony Boutland, Hythe, Southampton, England, assignors to Hovercraft Development Limited, London, England, a British company
Filed Apr. 6, 1966, Ser. No. 540,718
Claims priority, application Great Britain, Apr. 6, 1965, 14,615/65
15 Claims. (Cl. 114—67)

ABSTRACT OF THE DISCLOSURE

A gas-cushion vehicle for travelling over the surface of water produces a vehicle-supporting cushion of steam by evaporating water directly from the surface over which the vehicle travels, without taking the water into the body of the vehicle. Evaporation is effected either by radiating heat onto the surface of the water beneath the cushion space, or by direct heat exchange from heating elements carried by the vehicle and immersed in the water. The coolant circuit of a nuclear reactor may be used as the source of heat.

---

This invention relates to water-borne gas-cushion vehicles, that is to say, to vehicles which travel over the surface of water and which, in operation, are supported above that surface, at least in part, by a cushion of pressurised gas formed and contained in a space (the cushion space) beneath the body of the vehicle.

Hitherto, a vehicle-supporting gas-cushion has been formed by drawing in air from the atmosphere and then discharging this air, in a compressed condition, to the cushion space. This arrangement requires air fans of large capacity driven by internal combustion engines with the attendant disadvantages, for long-range operation, of the fan driving means consuming large volumes of fuel.

According to the present invention, a water-borne gas-cushion vehicle is provided with water evaporating means for forming its supporting cushion by evaporating water from the surface over which it travels. The term "water," used to denote the water subsequently evaporated, is intended to include water spray. Said water is preferably that directly exposed to the cushion space.

Evaporation of the water may be performed by radiant heat emitted by heating means disposed above the water. Alternatively, or in addition, evaporation may be performed by conduction, that is, by direct contact of the water with the heating means.

According to a further feature of the present invention, the heating means conveniently forms part of a coolant circuit of a nuclear reactor. This arrangement provides a vehicle with a very long operating range yet with an extremely small "burn-up" of fuel.

Figure 1:
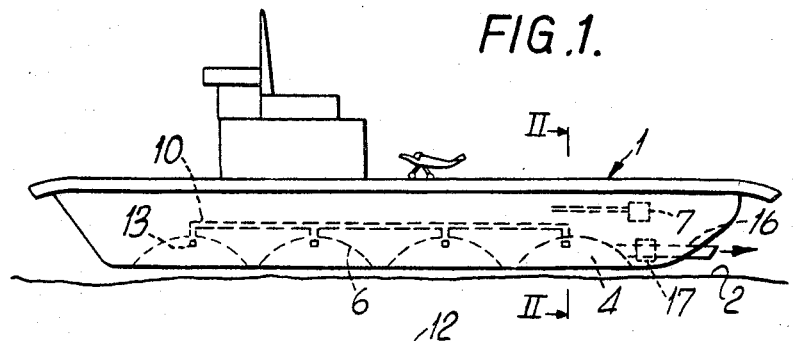
Figure 2:
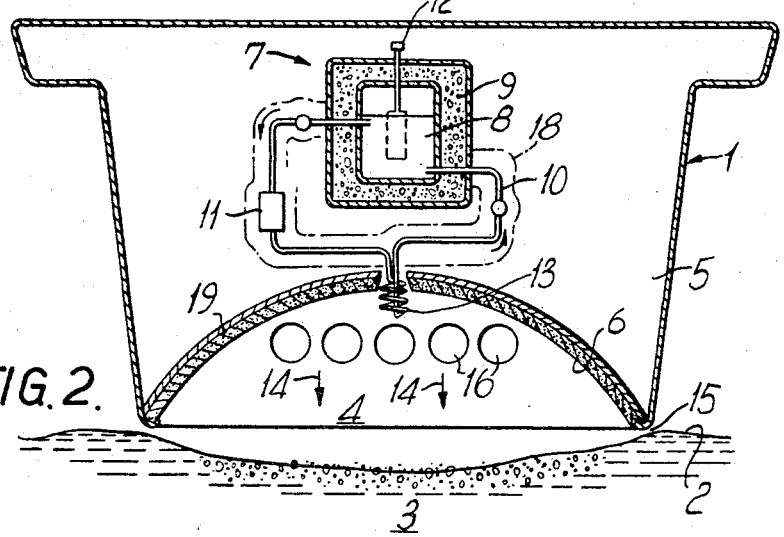
Figure 3:
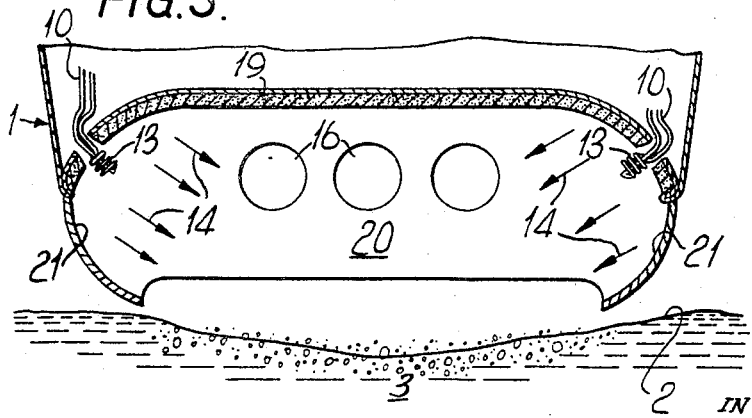
Figure 4:
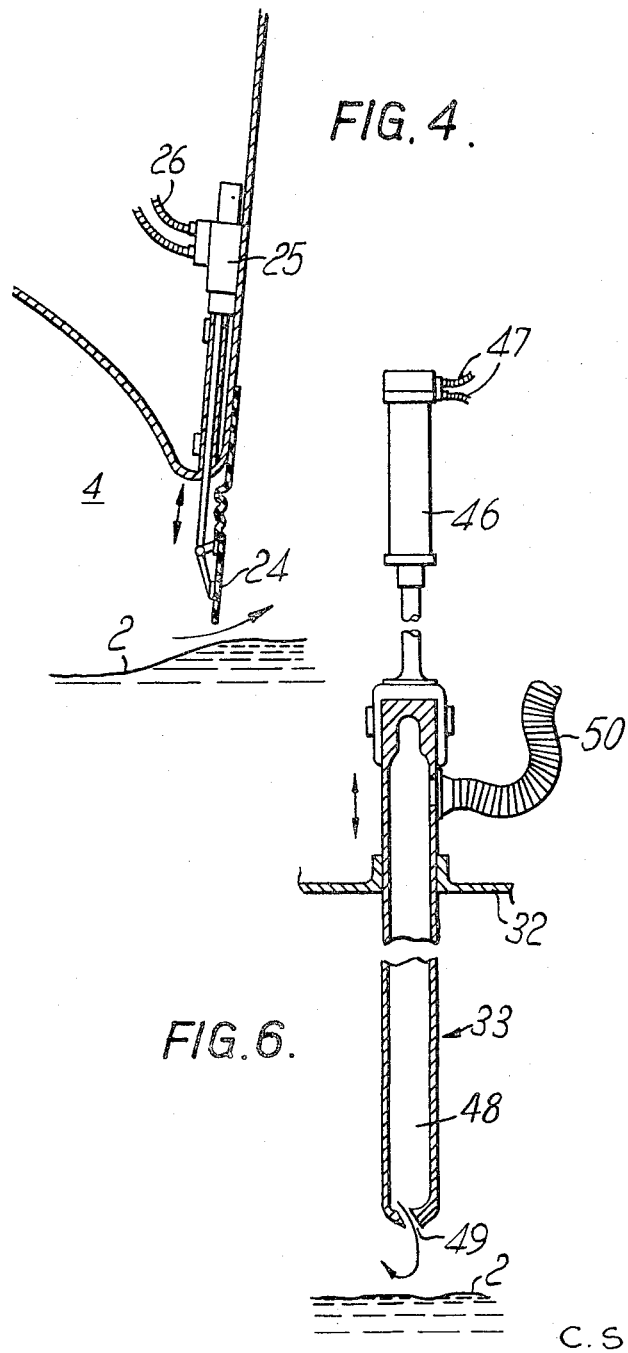
Figure 5:
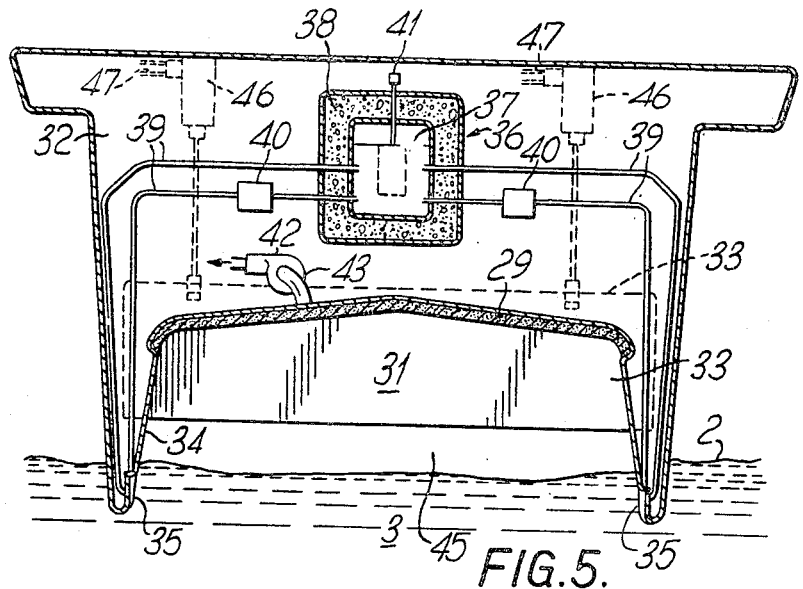
Figure 7:
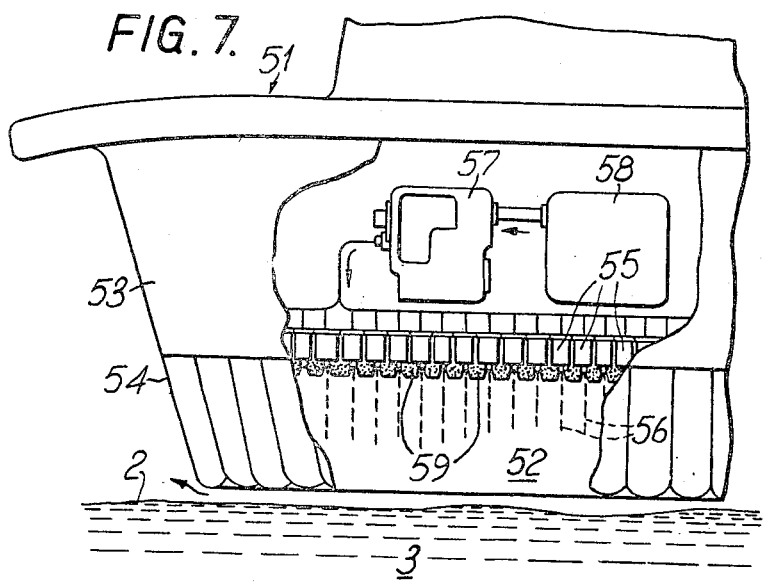
Figure 8:
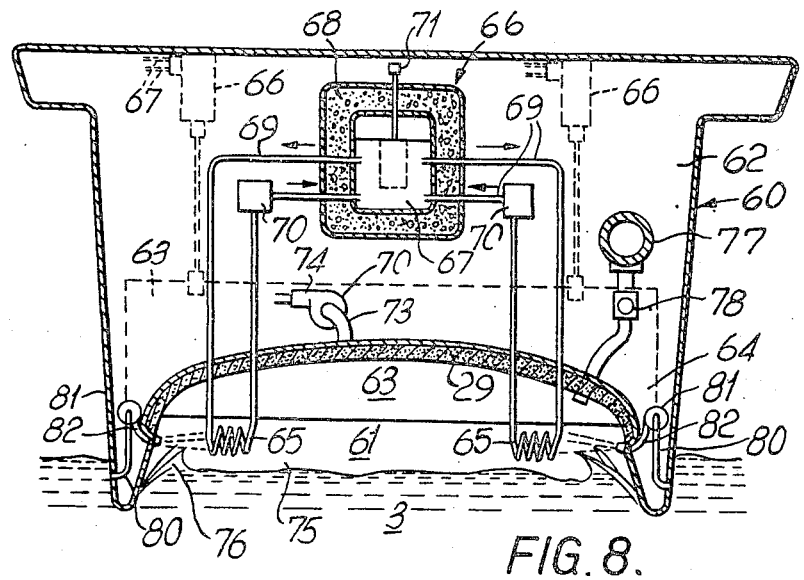
Figure 9:
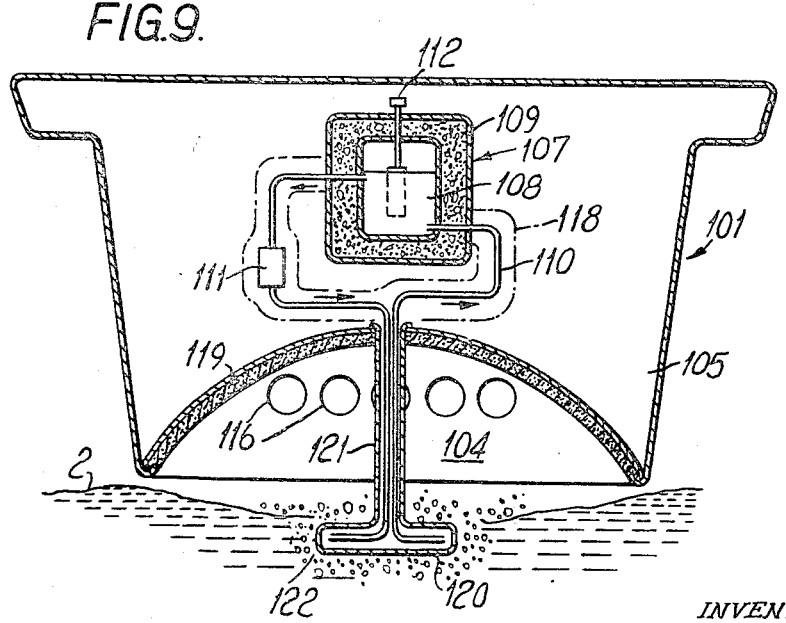

Embodiments of the invention will now be described by way of example with reference to the accompanying drawings wherein:

FIGURE 1 is a side view of the first embodiment,
FIGURE 2 is a section, to an enlarged scale, taken on the lines II—II of FIGURE 1,
FIGURE 3 is a modification of the embodiment illustrated in FIGURES 1 and 2,
FIGURE 4 is a modification of the embodiment of FIGURE 2,
FIGURE 5 is a sectional end view illustrating a second embodiment,
FIGURE 6 is a modification of the embodiment of FIGURE 4,
FIGURE 7 is a fragmentary side view, with parts removed, of a third embodiment,
FIGURE 8 is a sectional end view of a fourth embodiment, and
FIGURE 9 is a sectional end view of a fifth embodiment.

Referring to FIGURES 1 and 2, an aircraft-carrying gas-cushion vehicle 1 travels over the surface 2 of water 3, supported above the surface 2 by a fore-to-aft row of cushions 4 of pressurised steam formed and contained beneath the body (or hull) 5 of the vehicle.

The bottom of the vehicle body 5 is recessed to form a fore-to-aft array of concavities 6 of substantially parabolic (vertical) cross-section, the surfaces of which are heat reflective. (The surfaces of the concavities can be made to reflect heat by providing cladding of suitable metal, for example, stainless steel, by employing heat-reflecting paints or by polishing the surfaces themselves.) The hollows of the concavities 6 are presented towards the surface 2. The body 5 of the vehicle 1 houses a nuclear reactor 7 comprising a "fast" reactor core 8 enclosed in the usual reactor shielding 9. The reactor core 8 is cooled by a sodium-potassium liquid metal eutectic circulated in a closed circuit 10 by an induction pump 11. The reactor 7 is provided with the usual fuel-shift control and shut-down system 12.

The coolant circuit 10 includes a plurality of coiled sections 13, one of which is disposed in the space occupied by each cushion 4 (the cushion space) at substantially the focus of the parabolic concavity 6 bounding the cushion. The whole of the coolant circuit 10, with the exception of the coiled sections 13, is heat-insulated by lagging 18. The concavities 6 are heat-insulated by lagging 19.

In operation, the reactor coolant is heated in passage through the reactor core 8 as it is circulated by the pump 11. In passage through the coiled sections 13, heat radiated from the sections is reflected downwardly, in concentrated beams, by the parabolic concavities 6 on to the surface of the water 3 exposed to the cushion spaces, as indicated by the arrows 14. The water surface 2 is thus raised in temperature and is evaporated, producing cushions 4 of steam which support the vehicle 1 above the surface 2. The concavities 6 form plenum chambers, steam excess to cushion forming requirements escaping to atmosphere through annular clearances 15 between the water surface 2 and the peripheries of the concavities.

Five rearwardly facing nozzles 16 extend in a horizontal row from the rearmost concavity 6 and steam from the cushion 4 confined therein is discharged rearwards so as to propel the vehicle 1 forwards by reaction. Steam flow through the nozzles 16 is controlled by valve units 17. The heat emitting surface of the coolant section 13 of the rearmost concavity 6 has a larger area than the remaining sections 13 so that there is sufficient steam generated both to provide a cushion and to apply a propulsive thrust to the vehicle body. If required, any of the nozzles 16 could, in addition, or alternatively, be fed with steam collected, by means of suitable ducts, from the remainder of the concavities 6.

As the vehicle 1 moves forward water spray is formed in the cushion spaces and this spray also is evaporated by heat radiated by the concavities 6 to at least assist in forming the cushion 4.

In the modification illustrated in FIGURE 3, the vehicle 1 is supported above the surface 2 by a single cushion 20 of steam generated by heat reflected from two spaced and oppositely facing rows of parabolic concavities 21 extending fore-to-aft and along each side of the fore-to-aft axis. The foci of oppositely facing concavities 21 intersect at the surface 2 between the concavities. The concentrations of radiated heat are indicated by the arrows 14. Each concavity 21 has its own heat source comprising a coiled section 13 of reactor coolant circuit. The vehicle 1 is propelled, as described above, by reaction from steam discharged from rearwardly facing nozzles 16 and controlled by valve units 17 (not shown).

With reference to FIGURE 4, the embodiment of FIGURES 1 and 2 (and similarly the modification of FIGURE 3) may be provided with a flexible skirt structure 24 depending from the periphery of the vehicle body to allow the vehicle to traverse irregularities, such as large waves. The effective height of the skirt structure is controlled locally by a series of hydraulic actuators 25 attached to the vehicle body and under the control, through hydraulic signal lines 26, of a vehicle operator. Components of thrust may now be imposed on the vehicle body when cushion steam escapes to atmosphere under a lifted portion of the skirt structure 24 and can thus be used to manoeuvre the vehicle. The temperature of the steam in the cushion is not expected to be so high as to prohibit the use of conventional flexible materials (for example, rubberised fabric) in the manufacture of the skirt structure 24.

Referring now to FIGURE 5, an aircraft-carrying gas-cushion vehicle 30 is supported above the surface 2 of water 3 by a cushion 31 of pressurised steam formed and contained beneath the body 32 of the vehicle. The sides of the cushion 31 are contained by a spaced pair of parallel-disposed side-walls 34 of rigid construction depending from and extending lengthwise along the fore-to-aft sides of the body 32. The bottoms of the side-walls 34 dip into the water 3. The front end of the cushion 31 is contained by a curtain of steam issuing from a slot (not shown) extending, athwartships, between the fore ends of the side walls 34. The rear end of the cushion 34 is partially contained by a shutter 33 movable vertically between the side walls 34 by a pair of hydraulic actuators 46 under the control, through hydraulic signal lines 47, of a vehicle operator.

The lower immersed edges of the side walls 34 house heat exchangers 35, the outer surfaces of which are exposed to the water 3. The vehicle body 32 houses a nuclear reactor 36 comprising a "fast" reactor core 37 enclosed in shielding 38. The reactor core is cooled by sodium-potassium eutectic circulated in a pair of closed circuits 39, which circuits include the heat exchangers 35, by induction pumps 40. The reactor 36 has the usual fuel-shift control/shut-down system 41. The vehicle body 32 also houses a steam pump 42, the inlet 43 of which is connected to the space occupied by the cushion 34, and the outlet 44 to the fore-disposed slot mentioned above from which steam issues in the form of a cushion-containing curtain. The cushion space is heat-insulated by lagging 29.

In operation, the reactor coolant is heated in its passage through the reactor core 37 and is circulated through the heat exchangers 35 where heat is given up in evaporating some of the water 3 to form the cushion 31. Some of the steam formed is allowed to escape to atmosphere through the gap 45 between the shutter 33 and the water surface 2 so as to produce by reaction a propulsive thrust on the vehicle 30. This thrust can be varied by moving the shutter 33 through the hydraulic actuators 46 so as to alter the gap 45. Some more of the steam formed is drawn off and raised in pressure by the pump 42 and is thereafter used in curtain form to contain the fore end of the cushion 31.

For starting purposes a further shutter 33 is provided at the fore end of the cushion space adjacent the slot referred to above. Initially the two shutters 33 are immersed in the water but as soon as the cushion 31 is formed the pump 42 is started up and the fore-disposed shutter 33 retracted by its actuators 46.

In the modification of FIGURE 6 the front curtain is caused to issue from the bottom edge of the front shutter 33. This is achieved by giving the shutter a hollow interior 48 and a bottom edge with a longitudinal slot 49 and by connecting the interior of the shutter to the pump 42 by means of flexible ducting 50. By suitable adjustment of the front shutter the height of the front curtain can be reduced and hence the power required of the pump 42. If required the rear shutter 33 can be adapted in a similar way so as to allow a cushion-containing curtain of steam to issue from it bottom edge.

Referring now to FIGURE 7, a plenum chamber type gas-cushion vehicle 51 (also an aircraft carrier) is supported above the surface 2 of water 3 by a cushion 52 of pressurised steam formed beneath the vehicle body 53 and contained by a flexible wall or "skirt" 54 depending from the periphery of the body 53. The steam cushion is formed by evaporating the water surface 2 by means of a battery of lasers 55 mounted on the bottom surface of the vehicle body 53 so that their high intensity laser beams 56 project through holes therein on to the surface 2. The frequency of the beams 56 is adjusted so that only the surface 2 is evaporated and little or no heat is lost to the water beneath. The space occupied by the cushion 52 will contain a large amount of water spray which will be evaporated by the laser beams 56 passing through the mass of spray to add to the steam generated by surface evaporation.

Electrical power is supplied to the lasers 55 by a generator 57 driven by a gas turbine and nuclear reactor installation 58. The cushion space is heat-insulated by lagging 59.

The vehicle 51 is propelled by allowing steam to escape rearwardly from the cushion 52. This may be done by lifting the rear portion of the skirt 54, using the arrangement described in respect of the modification of FIGURE 4.

In a further modification, the reactor 58 is of the M.H.D. type. The electrical power generated by the reactor 58 now passes direct to the lasers 55 so that the generator 57 may be dispensed with.

FIGURE 8 illustrates an aircraft-carrying gas-cushion vehicle 60 supported above the surface 2 by a cushion 61 of pressurised steam. The vehicle 61 is similar in many respects to the vehicle 30 of FIGURE 5 and reference numerals 62 to 77 of FIGURE 8 correspond to reference numerals 32 to 47, respectively, of FIGURE 5.

The difference between the embodiments of FIGURES 5 and 8 is that in the latter figure the heat exchangers 65 are disposed within the space occupied by the cushion 61 adjacent the side walls 64 and the latter are of different vertical cross-section. The side walls 64 are, in fact, profiled so that as the vehicle moves through the water 3, the side walls continuously throw up sheets 76 of water and water spray over the heat exchangers 65 where it is evaporated to form the cushion 61. Further water is picked up from external the cushion space, through ducts 80, and discharged by pumps 81 through ducts 82 on to the heat exchangers 65.

When the cushion 61 has been formed, the vehicle 60 is moved forward by allowing steam to escape through the gap 75 but initial movement is achieved by conventional driving means, for example, water screw propellers driven by steam or gas turbines housed in the side walls 64.

At start up, with no cushion 61, the vehicle may be raised to a position where the heat exchangers 65 are just clear of the water by discharging high pressure air beneath the vehicle body 62 from a high pressure reservoir 77, provided with an air flow control valve 78.

With reference now to FIGURE 9, an aircraft-carrying gas-cushion vehicle 101 is supported above the surface 2 by a cushion 104 of pressurised steam. The vehicle 101 is similar in many respects to the vehicle 1 of FIGURE 2 and reference numerals 101 to 119 of FIGURE 9 correspond to reference numerals 1 to 19 of FIGURE 2.

In the embodiment of FIGURE 9, however, the cushion 104 is formed by a combined hydrofoil and heat exchange device 120 disposed beneath the cushion space and attached to the vehicle body 105 by a hollow support column 121. The reactor coolant circuit 110 includes the device 120 and, in operation, reactor coolant pumped through the circuit evaporates the water surrounding the device 120 so that steam bubbles 122 rise to the surface of the water to pass into the cushion space and form the steam cushion 104. Lift is also imparted to the vehicle 101 by the device 120 to assist the cushion 104 in supporting the vehicle. Assistance in forming the steam cushion 104 may also be given by any other of the water-evaporating arrangements of FIGURES 1 to 8.

In order to prevent salt from being deposited on any heat exchange surfaces disposed within the cushion space, for example, the sections 13 of FIGURES 2 and 3, these sections can be shielded from the atmosphere of the vehicle-supporting cushion by a window or shroud of transparent material able to withstand high temperatures, for example, quartz. An alternative arrangement is to provide a recess at each focus of a concavity 6 and to dispose the associated section 13 within the concavity. In another modification, steam can be raised in a steam generator (for example, a water-to-reactor coolant heat exchanger forming part of the coolant circuit 10 of FIGURE 2) and the steam discharged to the cushion space through the nozzle of an injector adapted to entrain atmospheric air, so that a mixture of air and steam is fed to the cushion space to at least assist in forming the vehicle-supporting cushion. The injector nozzle of this system will operate salt-free as its supply steam will be fresh water.

In a further modification, steam for the vehicle-supporting cushion is formed by directing a spray of water in atomised form towards a heat exchange element (for example a section 13 of FIGURE 2 and 3) so that the water droplets are evaporated before they impinge on the element. The water to be atomised can be scooped from the surface beneath the vehicle.

We claim:

1. A gas-cushion vehicle for travelling over the surface of water which, in operation, is supported above that surface, at least in part, by a cushion of pressurised gas formed and contained beneath the body of the vehicle, provided with means forming a cushion space beneath the vehicle body, and means for forming a vehicle-supporting cushion of steam in said space, said cushion-forming means including means for evaporating water directly from the surface over which the vehicle travels while said surface is exposed to the cushion space, without taking the water into the vehicle body.

2. A vehicle as claimed in claim 1 wherein said vehicle is provided with a nuclear reactor and said water evaporating means include means for utilising heat from the reactor coolant to evaporate said water.

3. A vehicle as claimed in claim 1 wherein said water evaporating means comprise a radiant heat source disposed in the upper region of the cushion space and means for reflecting heat from said heat source on to the water.

4. A vehicle as claimed in claim 3 wherein said means for reflecting heat on to said water comprise at least one heat-reflecting concavity having a focus, the hollow of the concavity being presented towards the water, and wherein said radiant heat source is disposed at substantially the focus of the concavity.

5. A vehicle as claimed in claim 3 wherein the means for reflecting heat on to said water comprise an array of heat-reflecting concavities extending in a substantially fore-to-aft direction, each of said concavities having a vertical cross-section of substantially parabolic form.

6. A vehicle as claimed in claim 3 wherein said vehicle is provided with a nuclear reactor, and said water evaporating means include means for utilising heat from the reactor coolant to evaporate said water, and wherein the means for reflecting heat on to said water comprise an array of heat-reflecting concavities extending in a substantially fore-to-aft direction, each of said concavities having a vertical cross-section of substantially parabolic form.

7. A vehicle as claimed in claim 1 wherein said water evaporating means comprise at least one heat exchanger normally in direct contact with said water.

8. A vehicle as claimed in claim 7 wherein the sides of the cushion are contained by a spaced pair of wall structures depending from and extending lengthwise along the sides of the vehicle body, and wherein each wall structure houses at least one such heat exchanger.

9. A vehicle as claimed in claim 7 wherein the vehicle is provided with a nuclear reactor and said water evaporating means comprise at least two heat exchangers forming part of the reactor coolant circuit, and wherein the sides of the cushion are contained by a spaced pair of wall structures depending from and extending lengthwise along the sides of the vehicle body to dip into the water beneath, said heat exchangers being housed in the bottoms of said wall structures.

10. A vehicle as claimed in claim 1 wherein said water evaporating means comprise a heat exchanger disposed in the cushion space, and means for causing water beneath the vehicle to be brought into contact with the heat exchanger.

11. A vehicle as claimed in claim 10 wherein the sides of the cushion are contained by a spaced pair of wall structures depending from and extending lengthwise along the sides of the vehicle body, and wherein said wall structures are profiled so as to cause water to be thrown into heat exchange relationship with said heat exchanger as said vehicle travels over said water.

12. A vehicle as claimed in claim 2 wherein the sides of the cushion are contained by a spaced pair of wall structures depending from and extending lengthwise along the sides of the vehicle body to dip into the water beneath, and said means for utilising heat from the reactor coolant comprise a pair of heat exchangers disposed in the cushion space, one adjacent the inner surface of each wall structure, the wall structures being adapted to cause water to be thrown into heat exchange relationship with said heat exchangers as said vehicle travels over said water.

13. A vehicle as claimed in claim 1 wherein said water evaporating means comprise a battery of lasers disposed above said surface and arranged to direct laser beams on to said surface.

14. A vehicle as claimed in claim 1 provided with combined heat exchanger and hydrofoil means disposed beneath the cushion space so that steam formed by evaporating water through said combined means passes into said cushion space.

15. A vehicle as claimed in claim 14 provided with a nuclear reactor, and wherein said combined heat exchanger and hydrofoil means is supplied with reactor coolant.

References Cited

UNITED STATES PATENTS 3,001,500 9/1961 Pinnes.
3,141,436 7/1964 Cathers et al.
3,207,113 9/1965 Tattersall.

ANDREW H. FARRELL, *Primary Examiner.*